Figure 1:
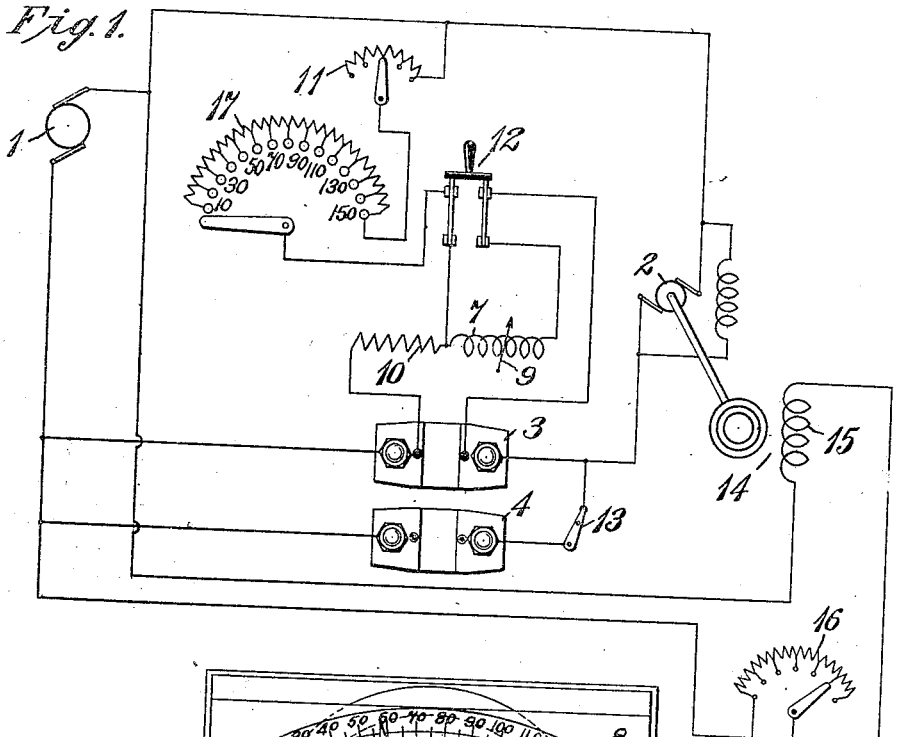

H. C. SPECHT.
ELECTRIC MEASURING INSTRUMENT.
APPLICATION FILED DEC. 2, 1909.

1,046,883.

Patented Dec. 10, 1912.

WITNESSES:

INVENTOR
Hans C. Specht
BY
ATTORNEY

UNITED STATES PATENT OFFICE.

HANS C. SPECHT, OF PITTSBURGH, PENNSYLVANIA, ASSIGNOR TO WESTINGHOUSE ELECTRIC AND MANUFACTURING COMPANY, A CORPORATION OF PENNSYLVANIA.

ELECTRIC MEASURING INSTRUMENT.

1,046,883.     Specification of Letters Patent.     Patented Dec. 10, 1912.

Application filed December 2, 1909. Serial No. 531,056.

*To all whom it may concern:*

Be it known that I, HANS C. SPECHT, a subject of the Emperor of Germany, and a resident of Pittsburgh, in the county of Allegheny and State of Pennsylvania, have invented a new and useful Improvement in Electric Measuring Instruments, of which the following is a specification.

My invention relates to systems of electric current measurement and it has for its object to provide, in a system of the class above indicated, means for accurately determining slight variations from a predetermined relatively large current.

It is often desirable to measure relatively slight variations from a predetermined current value and this has heretofore been difficult to accomplish accurately since, although the variations could easily be read on the lower scale of a two-scale instrument, it was impossible to employ this scale for the aggregate current flowing in the circuit. For example, in determining the core loss of a dynamo-electric machine, which is driven by an electric motor, the current supplied to the driving motor under one field excitation of the machine being tested might be approximately 100 amperes, which would be read on a 150 ampere scale, while, under another field excitation, the current supplied to the driving motor might be 103 and a fraction amperes, which must also be read on the 150 ampere scale. While the error of each of the current values read might be relatively small, if the errors were in the same direction, the error which would result when the difference of the two quantities was obtained would be relatively great since this difference is a small quantity.

An ammeter of a well known type, such as is illustrated in Patent 392,387, granted to Edward Weston, November 6, 1888, when adapted for measuring values of electric currents, comprises a constant magnetic field, usually produced by a permanent horse-shoe magnet, a coil rotatably mounted in the field of the magnet, a pointer or indicator attached to the coil, a suitable resistance in series with the coil and one or more shunts of relatively low resistance connected across the terminals of the meter.

According to my present invention, I interpose a variable resistance between an intermediate point in a current-measuring instrument, which may be the junction of the movable coil and the meter resistance, and the side of the circuit which is opposite that to which the meter resistance is connected in order to regulate the amount of current flowing in the movable coil. The regulating energy may, of course, be produced by any suitable source and the resistance may be regulated until the pointer of the measuring instrument, which is connected for reading on the lower scale, is brought to zero. Under these conditions, the meter proper, exclusive of the shunts, is cut off from its source of current supply and the circuit connecting the intermediate point in the meter with the variable resistance is simultaneously interrupted.

If the conditions are so changed that the current flowing through the circuit is increased by a relatively small increment, the meter may be again connected in circuit, the variable resistance circuit being closed at the same time. Thereupon the pointer of the instrument will indicate, not the aggregate current flowing in the circuit, but only the difference between the current flowing at the time when the adjustment to zero was effected, and at the time of the reading.

My invention is illustrated in the accompanying drawings in which—

Figure 2:
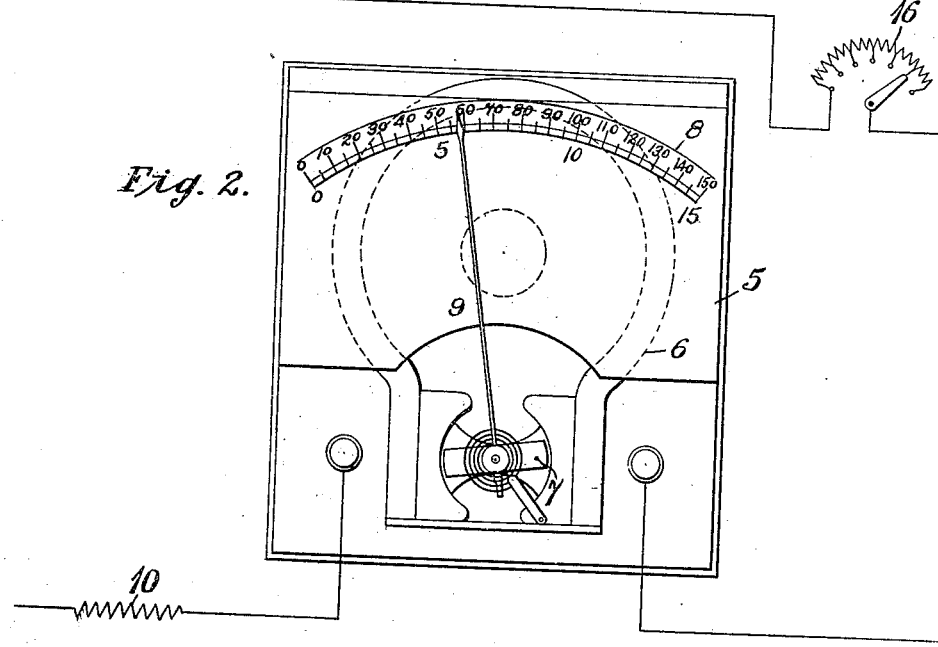

Figure 1 is a diagrammatic view of a system of electric current measurement arranged in accordance therewith, and Fig. 2 is a partially diagrammatic view of a measuring instrument, which may be advantageously employed in a system of the class illustrated in Fig. 1.

Referring to the drawings, electrical energy may be supplied from any suitable source, such as generator 1 to an electric motor 2. In one side of the motor-supply circuit, low resistance shunts 3 and 4 are included in parallel and an ammeter 5 is connected across the shunt 3. The ammeter 5 comprises a permanent stationary horse-shoe magnet 6, a rotatably mounted coil 7, a two-scale dial 8, a pointer 9, and a resistance 10, which is connected in series with the movable coil 7. Variable resistances 11 and 17 are connected from a point between the movable coil 7 and the resistance 10 to the opposite side of the supply line. The resistance 17 is preferably calibrated so that it may be adjusted to compensate approximately for the current traversing the meter coil 7 when it is connected for low-scale indications and when any predetermined current, which may be measured by the high scale of the instrument, is flowing in the motor circuits. A double-pole single-throw switch 12 is adapted to simultaneously break and make the shunt circuit in which the variable resistances 11 and 17 are connected and the circuit which connects the free end of the movable coil 7 to one end of the shunt 3. A single-pole single-throw switch 13 is adapted to exclude the shunt 4 from the parallel circuit in which it is located, both of the shunts 3 and 4 being included in parallel for the high scale reading of the instrument and only the shunt 3 being included in the circuit for the lower scale of the instrument.

The motor 2 is adapted to drive a generator 14, provided with a shunt field magnet winding 15 in series with which a variable resistance 16 is connected.

Assuming that the circuit connections of the system correspond to Fig. 1 of the drawings, and that the meter indicates a current of 100 amperes supplied to the motor, if the switches 12 and 13 are successively opened, the variable resistance 17 is adjusted to the proper point of calibration (marked 100) and the switch 12 is closed, the ammeter will only indicate some small value close to the zero point. The resistance 11 may now be adjusted to bring the pointer exactly to zero. If the load on the motor is slightly varied by regulating the field resistance 16, the low scale meter indication will be a correct reading of the difference between the final motor load and 100 amperes for which a compensation was made in the meter coil.

As the above example indicates, the system of my invention may be utilized in obtaining accurately the core loss of a dynamo-electric machine, but it is not confined to any specific application.

Care should be taken not to complete the circuit through the resistances 11 and 17 until the switch 13 is open, since the compensating current is likely to damage the instrument unless it is counteracted by the normal flow of current in the meter coil incident to low-scale meter operation.

It will be understood that a meter having a single scale may be employed in lieu of the meter 5 and a second meter utilized for indicating the motor current at all times. Furthermore, the high scale of the meter 5 may, of course, be used for indicating the variations by suitably designing the resistance 17, but, since these variations are usually small, the object of my improvement would be partially defeated.

The shunts 3 and 4 together constitute a low resistance shunt connection to the instrument, which may be adjusted by opening and closing the switch 13.

I desire that the scope of my invention shall not be restricted to any particular type of current-measuring instrument since anyone familiar with the art can easily adapt my invention to various alternating or direct current instruments, which may or may not be provided with movable coils.

I further desire that only such limitations shall be imposed as are indicated in the appended claims.

I claim as my invention:

1. The combination with an electric circuit, an electric measuring instrument therein comprising an actuating coil and means for varying the sensitiveness of the instrument, of means for neutralizing the current traversing the actuating coil and means for simultaneously interrupting the circuit of the actuating coil and nullifying the neutralizing means.

2. The combination with an electric circuit, an electric measuring instrument therein comprising a movable coil, a pointer operatively connected thereto and a two-scale dial, and means for varying the sensitiveness of the instrument, of adjustable means for neutralizing, in the movable coil, the effect of predetermined high electric values in the circuit, the instrument being thereby rendered sensitive to relatively small variations in said values.

3. The combination with an electric circuit, a current-indicating instrument therein comprising a movable coil, a pointer operatively connected thereto and a two-scale dial, and means for varying the current relation between the electric circuit and the movable coil, of adjustable means for neutralizing, in the movable coil, the effect of predetermined relatively high values of electric current in the circuit, whereby small variations from the aforesaid electric current values may be indicated on the low-current scale of the instrument.

4. The combination with an electric circuit, an electric-current-measuring instrument having an indicator coil included therein and an adjustable low-resistance shunt connection to said coil, of adjustable means for neutralizing the current in the indicator coil and means for simultaneously interrupting the circuit of the indicating coil and nullifying the effect in the neutralizing means.

5. The combination with an electric circuit and a current meter therein having an indicator coil, of means for neutralizing the current in the indicator coil at any predetermined value of current flowing in the circuit, so that the coil will thereafter indicate variations from said predetermined value, and means for simultaneously interrupting the indicator coil and annulling the effect of the neutralizing means.

6. The combination with an electric circuit and a current-indicating instrument therein comprising a movable coil, a pointer attached thereto, a resistance in series with said coil, and a low-resistance shunt connected in multiple-circuit with the coil and resistance, of means for neutralizing the current in the movable coil and means for simultaneously interrupting the circuit of the movable coil and annulling the effect of the neutralizing means.

7. The combination with an electric circuit and a current-indicating instrument therein comprising a movable coil, a pointer attached thereto, a resistance in series with said coil, and a low-resistance shunt connected in multiple-circuit with the coil and resistance, of a variable resistance connected across the circuit, one end of which is connected to the junction of the coil and the resistance of the indicating instrument, and a two-pole switch that is adapted to simultaneously interrupt the variable resistance circuit and the circuit through the movable coil.

In testimony whereof, I have hereunto subscribed my name this 17th day of November, 1909.

HANS C. SPECHT.

Witnesses:
R. A. McCARTY,
B. B. HINES.